United States Patent
Mahmoud

(10) Patent No.: US 7,272,194 B1
(45) Date of Patent: Sep. 18, 2007

(54) METHOD TO TRANSMIT BITS OF DATA OVER A BUS

(75) Inventor: Fadi A. Mahmoud, Livermore, CA (US)

(73) Assignee: Adaptec, Inc., Miliptas, CA (US)

( * ) Notice: Subject to any disclaimer, the term of this patent is extended or adjusted under 35 U.S.C. 154(b) by 960 days.

(21) Appl. No.: 10/215,069

(22) Filed: Aug. 7, 2002

(51) Int. Cl.
*H04L 25/34* (2006.01)

(52) U.S. Cl. .................................... 375/286
(58) Field of Classification Search ............. 375/286, 375/293; 719/326, 321
See application file for complete search history.

(56) References Cited

U.S. PATENT DOCUMENTS 6,317,469 B1 * 11/2001 Herbert .................. 375/293

* cited by examiner

*Primary Examiner*—Pankaj Kumar
(74) *Attorney, Agent, or Firm*—Martine Penilla & Gencarella, LLP

(57) ABSTRACT

A method to increase data transmission over a SCSI bus is provided including assigning a voltage level to each one of a plurality of bit combinations, and generating a signal level having the voltage level corresponding to one of the plurality of bit combinations sought to be transmitted. The method also includes transmitting the signal level to a receiver to send one of the plurality of bit combinations during a data transmission interval.

24 Claims, 7 Drawing Sheets

METHOD TO TRANSMIT BITS OF DATA OVER A BUS

BACKGROUND OF THE INVENTION

1. Field of the Invention

This invention relates generally to the field of computing technology and more particularly concerns the optimization of data transfer rates by sending more data during a clock period by using multilevel coding of data signals.

2. Description of the Related Art

The art of networking computers has evolved over the years to bring computer users a rich communication and data sharing experience. Typically, in a network, numerous devices may be connected to a computer to maximize computing power and efficiency. As is well known, new levels of sophisticated communication technologies enable users to share information across both large and small networks.

In computer technology, computers may intercommunicate through data transmission through a network connecting numerous computers. For example, in a typical computer system, a computer system may include a computer and peripheral devices such as, for example, storage devices which are interconnected by data buses. For the computer to transfer data to and from the storage device, an input and output connected by differential drivers may be utilized. Within a computer system, it is often desirable to connect a variety of peripherals to the system bus of the computer itself for communication with the central processing unit and other devices connected to the computer. A variety of bus types may be used for this purpose.

To access and control certain types of peripheral devices connected to a computer system, the computer generally utilizes host adapter cards (or controllers) attached to the computer's internal bus. The computer may also have peripheral device controllers built into the motherboard. These controllers serve to coordinate and manage the data communication to and from the peripheral devices through the bus. Controllers may be in the form of a video display adapter, an integrated drive electronics (IDE) controller, a small computer system interface (SCSI) controller, or other similar cards or chips which control peripheral devices. Such controllers may communicate with the peripheral devices through use of a bus connecting the computer with the peripheral devices. By use of software device drivers, a host computer can instruct a SCSI chip within the SCSI controller to manage a specific peripheral device and control the data transfer between the peripheral device and the host computer. Therefore, it is important to have optimum throughput through a bus so controllers and peripheral devices may communicate with each other in an optimum manner.

FIG. 1A illustrates an example of a computer system 10. The computer system 10 includes a computer 12, a disk drive 14, a tape drive 16, and any number of other peripherals 18 such as card reader units, voice input/output, displays, video input/output, scanners, etc. The computer and peripherals in this example are connected via a Small Computer System Interface (SCSI) bus 20, although a wide variety of other buses may also be used.

Any number of computers or hosts may be present in computer system 10 and be connected to SCSI bus 20. Each computer may also contain a variety of hardware and software. By way of example, computer 12 includes a monitor 30, a motherboard 32, a wide variety of processing hardware and software 34 and a SCSI host adapter card (or interface card) 36. The host adapter card 36 provides an interface between the microcomputer bus of computer 12 located on motherboard 32 and SCSI bus 20.

SCSI is a universal parallel interface standard for connecting disks and other high performance peripherals to microcomputers. However, it should be appreciated that computer system 10 is an example of a system, and other interface standards having characteristics similar to SCSI may also be used in such a computer system.

In one example, SCSI bus 20 is an 8-bit parallel flat cable interface (18 total signals) with hand shakes and protocols for handling multiple hosts and multiple peripherals. It has both a synchronous and an asynchronous mode, and has defined software protocols. In the embodiment shown, the SCSI bus uses differential drivers, although SCSI is also available with single wire drivers. SCSI interface cards (such as card 36) plug into most microcomputer buses including VME, Multibus I and II, PCI, ISA, VL, EISA and MCA. In another embodiment, SCSI bus 20 is a 16-bit parallel cable interface (27 total signals). In other embodiments motherboard 32 has SCSI adapter card 36 incorporated into the motherboard itself, and a separate, plug-in adapter card is not needed. SCSI bus 20 is a multi-drop bus typically produced as a flat cable that connects from a computer 12 to any number of peripherals. In this example, disk drive 14, tape drive 16, and other peripherals 18 connect to SCSI bus 20 by tapping into the bus. In other examples, it is possible for any number of peripherals to be inside computer 12 in which case SCSI bus 20 may also be present inside computer 12 also.

Disk drive 14 includes the physical disk drive unit 40 and SCSI controller card 42 and other internal cables and device level interfaces (not shown) for enabling the unit to communicate with computer 12. After connecting to disk drive 14, SCSI bus 20 continues on to connect to tape drive 16. The tape drive 16 includes the physical tape drive 50, SCSI controller card 52, and other internal cables and interfaces (not shown) for communicating with computer 12.

In a typical SCSI data transmission system, a transmitter is connected to a receiver by transmission lines. When data is transferred from the transmitter to the receiver, which may happen, for example, when the SCSI controller car 52 transmits data to the disk drive 14, data can be sent where one bit is sent in a clock cycle at given frequency. If a data transmission is double clocked, one bit may be sent per half cycle so that two bits of data may be sent during one full clock cycle. Therefore, at maximum, prior art systems are not generally capable of sending more than 2 bits per full clock cycle. Consequently, at a frequency of, for example 160 MHz, 320 Mbits of data per second may be sent. This severely limits the amount of data throughput that may be transmitted through a bus such as, for example, the SCSI bus 20.

FIG. 1B shows a diagram 50 illustrating a time progression in relation to data transmission in a typical data transmission bus. Double transition clocking, (also referred to as dual edge clocking or double clocking as used herein) can be utilized in data transmission so both the leading edge and the trailing edge of the clocking signal are used to clock a data line sampling. In this example, data sent through a bus is double clocked so two voltage signal levels corresponding to a bit content of "0" and "1" respectively are utilized to transmit data from the transmitter to the receiver. As is well known by one skilled in the electrical arts, digital data is transmitted using a single bit "0" or a single bit "1". In this environment, a signal level voltage of 0 corresponds to the bit content of "0" and a signal voltage of 5 volts corresponds to the bit content of "1". A clock signal 52 is coordinated with digital signal 54 so each of the clock edges initiates a signal level output as shown by data initiation 56. Unfortunately, after a certain frequency is reached, data transmission through a bus is limited due to numerous constraints. For example, a particular bus has a certain maximum bandwidth with a cut off frequency. Typically, the cutoff frequency is 320 MHz, and any frequency beyond 320 MHz is very difficult to utilize. Therefore, even with double clocking, it is very difficult to achieve greater than a data transfer rate of 640 Mbytes per second in SCSI systems. Unfortunately, when the cutoff frequency is reached, the signal becomes so degraded due to increased noise levels that it is extremely difficult if not impossible to tell if the digital signal is transmitting a "0" or a "1". Consequently, after a certain frequency is reached, data throughput speed is limited and data transmission speeds can be a bottleneck in data processing operations.

In view of the foregoing, what is needed is a new and improved methodology for optimizing data transmission methods by enhancing digital data throughput though a SCSI bus. Such an approach would increase data throughput thereby greatly increasing the efficiency and operating effectiveness of a computer system.

SUMMARY OF THE INVENTION

Broadly speaking, the present invention fills these needs by providing computer implemented methods for optimizing data transfer, speeds through the intelligent use of multilevel coding to transfer multiple bits per signal level thereby enabling the transmission of at least 4 bits every clock cycle.

It should be appreciated that the present invention can be implemented in numerous ways, including as a process, an apparatus, a system, a device, a method, or a computer readable medium. Several inventive embodiments of the present invention are described below.

A method to increase data transmission over a SCSI bus is provided including assigning a voltage level to each one of a plurality of bit combinations, and generating a signal level having the voltage level corresponding to one of the plurality of bit combinations sought to be transmitted. The method also includes transmitting the signal level to a receiver to send one of the plurality of bit combinations during a data transmission interval.

In another embodiment, a method to expand bus bandwidth for digital data signals is disclosed which includes assigning each one of at least four voltage levels to a corresponding one of at least four bit combinations, and generating a signal level using one of the at least four voltage levels. The one of the at least four voltage levels corresponds to a bit combination to be transmitted. The method also includes transmitting the signal level to a receiver to send two bits of data encoded in the one of the at least four voltage levels, and matching the one of the at least four voltage levels of the signal level with a corresponding one of the at least four bit combinations.

In yet another embodiment, a method to expand bus bandwidth for digital data signals is provided. The method includes assigning each one of at least eight voltage levels to a corresponding one of at least eight bit combinations where each of the at least eight bit combinations including at least 3 bits of data. The method also includes generating a signal level using the one of at least eight voltage levels where the one of at least eight voltage levels corresponds to a bit combination to be transmitted. The method further includes transmitting the signal level to a receiver.

In another embodiment, an apparatus to expand bus bandwidth for digital data signals is provided. The apparatus includes a transmitter configured to generate a signal level using one of a plurality of voltage levels, each one of the plurality of voltage levels corresponding to a particular one of a plurality of bit combinations.

The advantages of the present invention are numerous. Specifically, by having multilevel coding of data where a voltage amplitude of a signal level can signify a particular bit combination, multiple bits of data may be sent during each of the clock edges (e.g., a combination of bits may be sent for every half cycle during a double clock data transmission). Therefore, more data may be transmitted than previously possible thereby optimizing data management in a computer system. As a result, data transmission speeds may no longer be a bottleneck of computing systems.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

An invention is described for a method of expanding a bus so an optimized amount of data may be transmitted in a computer system. In this methodology, multilevel coding is utilized to transmit multiple bits of data per signal level in a digital data transmission system. It will be obvious, however, to one skilled in the art, that the present invention may be practiced without some or all of these specific details. In other instances, well known process operations have not been described in detail in order not to unnecessarily obscure the present invention.

The data transmission methodology described herein enables many times more data to be sent in a same data transmission media than prior art systems. The multilevel coding described herein enables multiple data voltage levels to be utilized to transport a larger amount of data than previously possible. In one embodiment, the multilevel coding has four levels of voltage each signifying a different data content. Therefore instead of carrying one bit of data per half clock cycle in a double clocked system, the multilevel coding method may carry 4 bits of data per clock cycle in a double clocked system with a given data transmission frequency. In addition, another embodiment of the present invention may carry 8 or more bits of data per clock cycle in a double clocked system by utilizing 8 or more levels of voltage. As a result, digital data transmission limits previously seen are not applicable with utilization of the methodology described herein.

Figure 1A:
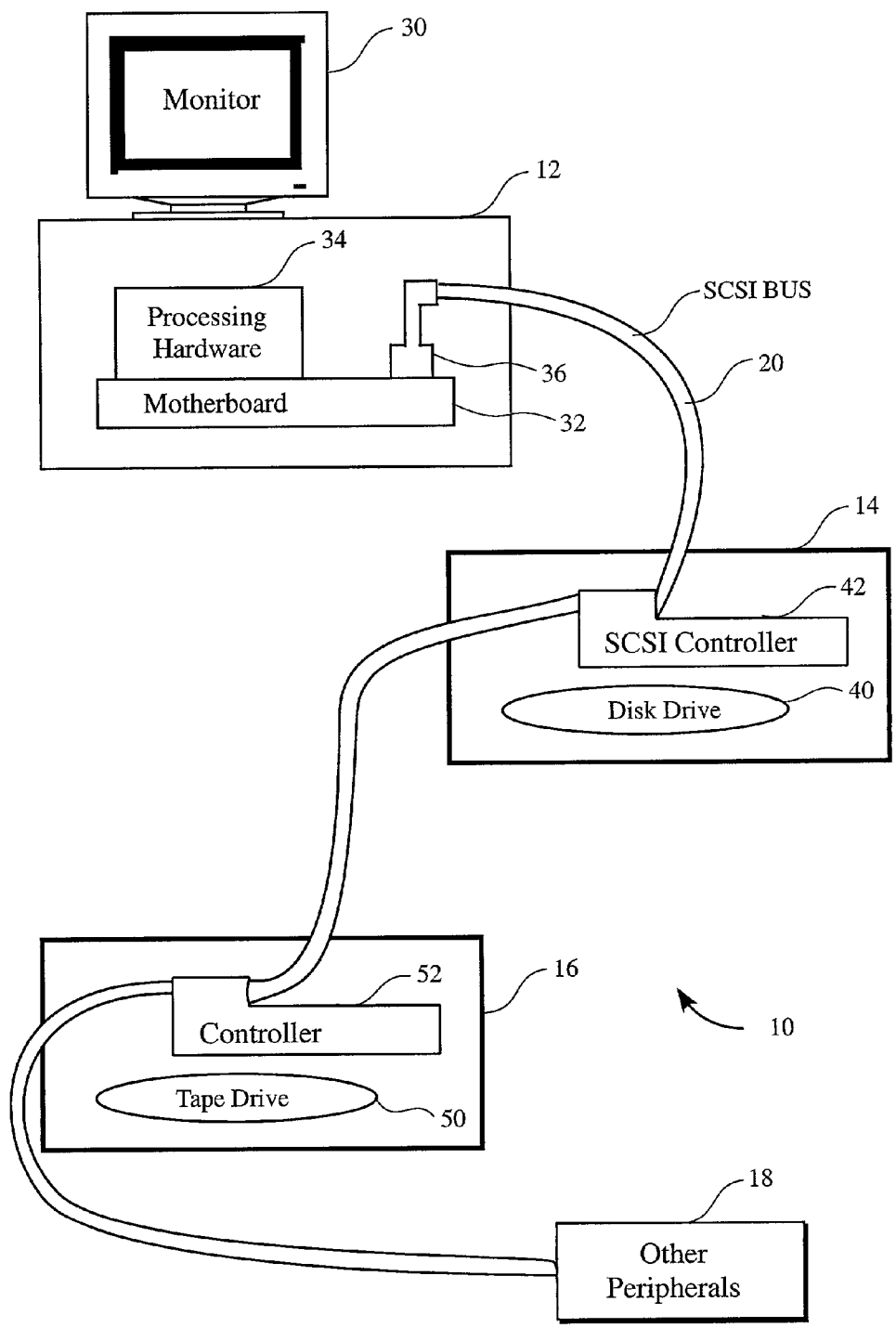
FIG. 1A illustrates an example of a computer system.
Figure 1B:
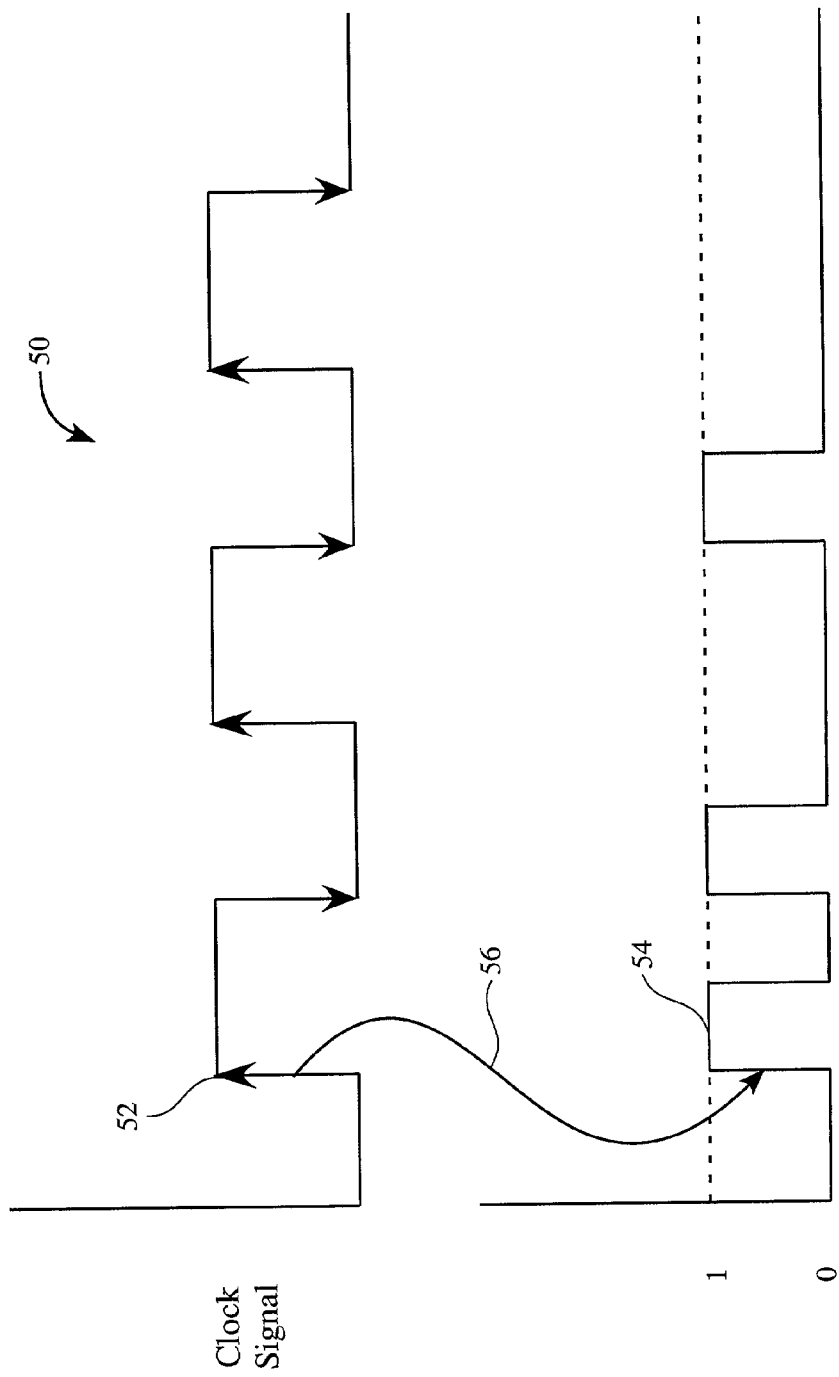
FIG. 1B shows a diagram illustrating a time progression in relation to data transmission in a typical data transmission bus.
Figure 2A:
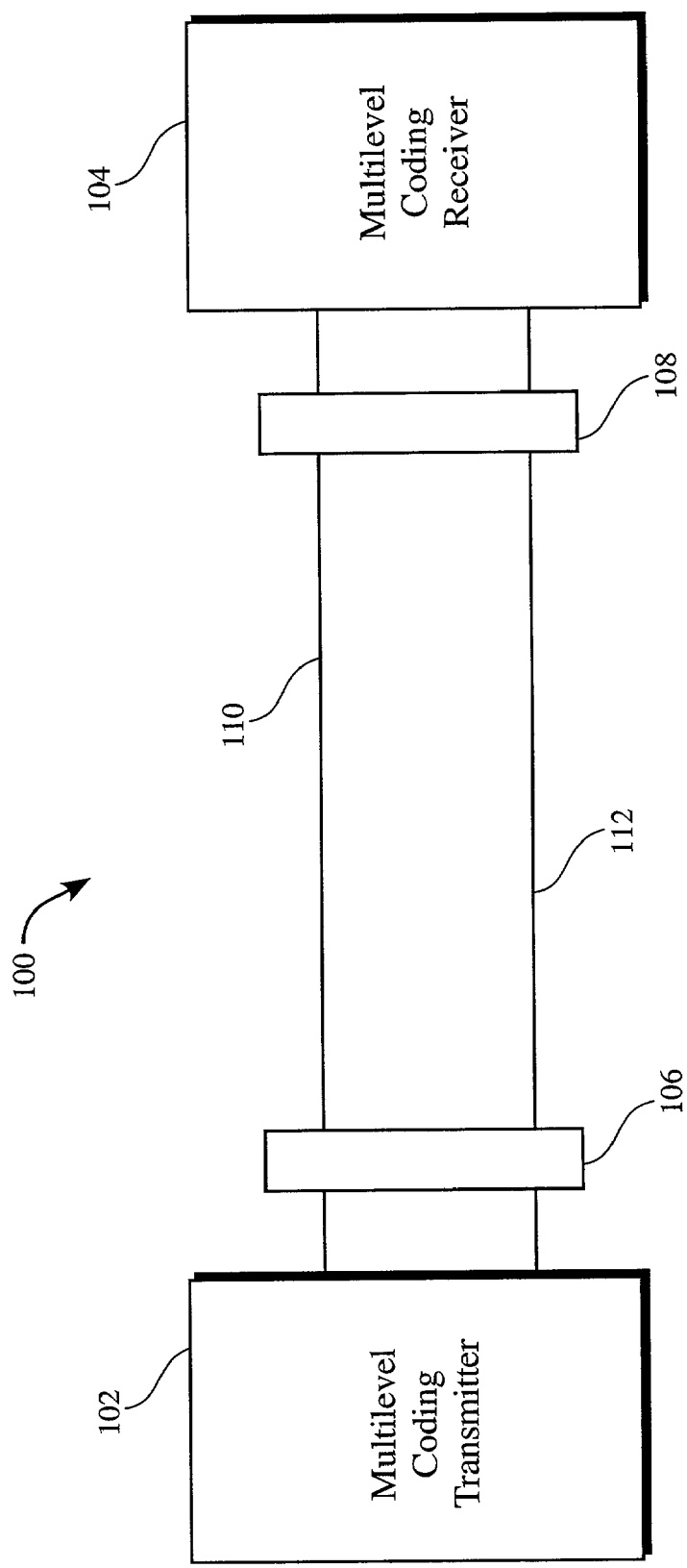
FIG. 2A shows a diagram of a multilevel coding (MLC) transmission system in accordance with one embodiment of the present invention.

FIG. 2A shows a diagram 100 of a multilevel coding (MLC) transmission system in accordance with one embodiment of the present invention. In this embodiment, an MLC transmitter 102 is connected with a multilevel coding receiver 104 through transmission lines 110 and 112 signifying a SCSI bus. It should be understood that the methodology described herein may be used in any suitable type of bus. A terminator 106 connects the transmission lines 110 and 112 near the MLC transmitter 102 and a terminator 108 connects the transmission lines 110 and 112 near the MLC receiver 104. It should be appreciated that the configuration of the transmission system as shown in diagram 100 is exemplary in nature and any suitable transmission system with the MLC transmitter 102 and the MLC receiver 104 can implement the methodology of the MLC transmission method. In one embodiment, the MLC transmitter 102 is configured to be capable of matching a certain combination of bits (such as, for example, bit values of "00", "01", "10", "00") with a specific signal level voltage or amplitude. Therefore, by coding all of the data to be transferred in this system, multiple bits of data may be sent per changes in signal level. Multilevel coding as used herein is the use of multiple voltage signal levels to code specific bit combinations or bit contents. It should be understood that a data transmission signal may include any suitable number of signal levels signifying the bit combinations being transmitted.

On the receiver end, the receiver 104 is configured to receive the signal level voltage, and from the voltage determine the bit combination contained within the signal level by matching the voltage of the signal level to the corresponding bit combination. It should be understood that the transmitter 102 and the receiver 104 may be configured in any suitable way that would enable them to communicate using multilevel coding as described below in reference to FIGS. 2B, 3, 4, and 5. In one embodiment, the transmitter 102 and the receiver 104 may include logic that would enable the coding of certain bit combinations to specific signal levels and the decoding of the specific signal levels to certain bit combinations. In another embodiment, software may enable the coding and decoding of certain bit combinations and specific signal levels. In yet another embodiment, a combination of hardware and software may provide the intelligence for the coding and decoding described herein in reference to FIGS. 2B, 3, 4, and 5. In such a way, the transmitter 102 and the receiver 104 may be utilized to optimize digital communications.

Figure 2B:
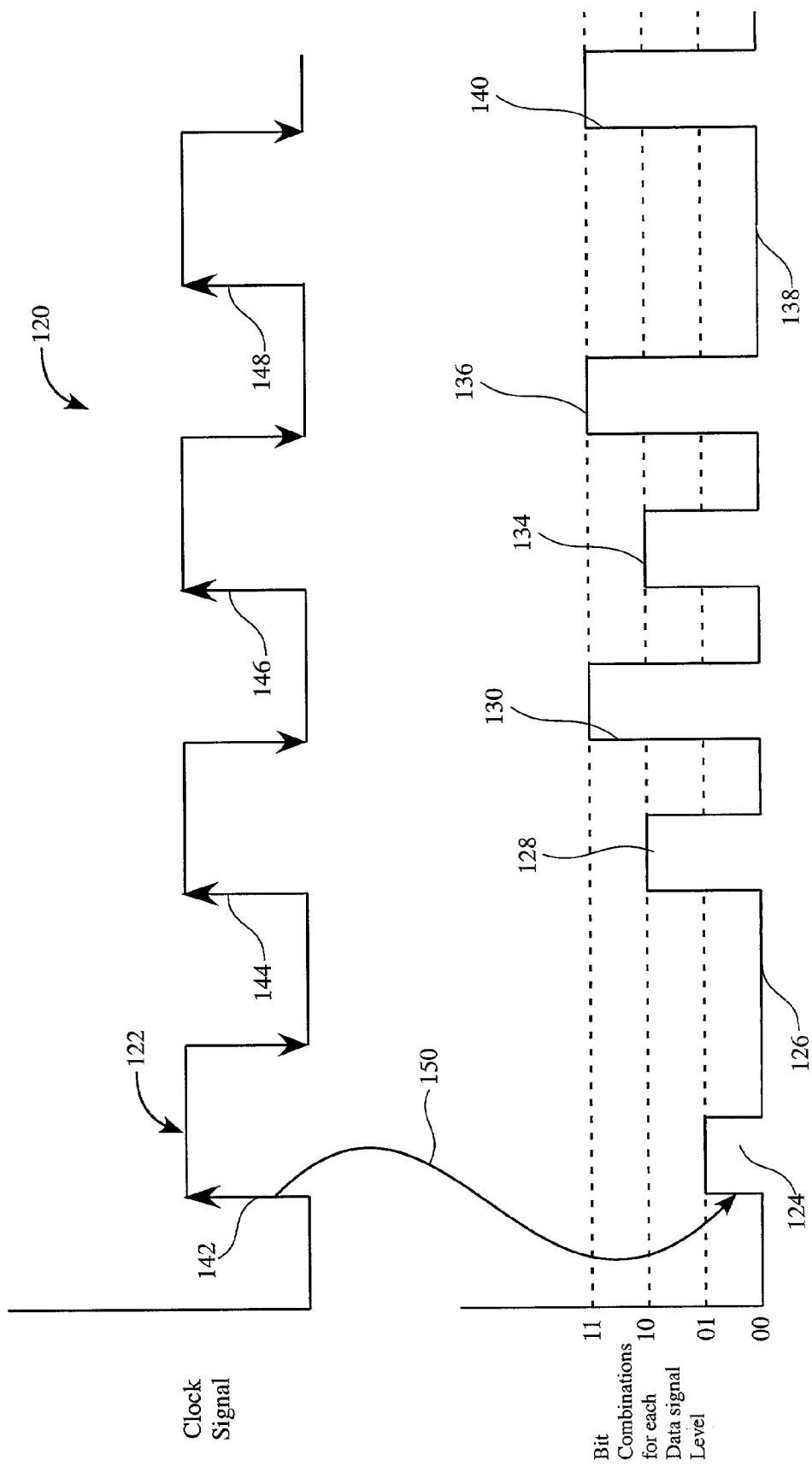
FIG. 2B shows a diagram illustrating clock cycles at a given frequency initiating MLC data transmissions in accordance with one embodiment of the present invention.

FIG. 2B shows a diagram 120 illustrating clock cycles at a given frequency initiating MLC data transmissions in accordance with one embodiment of the present invention. In this embodiment, the diagram 120 shows clock cycles 122 at a particular frequency. It should be appreciated that the MLC data transmission methodology may be utilized where the data transmissions are clocked at any suitable frequency such as, for example, 10 MHz, 20 MHz, 40 MHz, 80 MHz, etc.). The clock diagram shows how the clock cycles 122 initiates MLC data transmissions and shown by an initiator 150. Such initiation occurs both at the leading edge and the trailing edge of the clock cycles in a double clocking system. In this embodiment, the data transmission is double clocked so two signal levels (the term signal levels as used herein refer to data signal voltage amplitudes) are sent during each clock cycle. Therefore, during a data transmission interval (one clock cycle in single clocking or half clock cycle in double clocking) two bits of binary data may be sent per signal level. Four voltage levels are shown for the transmission signal which each signify different data content. In one embodiment, the four levels shown signify binary data with bit combinations of "11", "10", "01", and "00". It should be appreciated that the actual voltage levels signifying the bit combinations may be any suitable voltages as long as each of the voltage levels are discernible from another in a data transmission system as described herein. In one embodiment, signal level voltages of 5v, 3v, 1.5v, 0v correspond respectively to the bit combinations of "11", "10", "01", and "00". Therefore, depending on the voltage of the signal sent, one of the four data contents are sent. The description of the data transmission shown in FIG. 2B is merely exemplary and any suitable data content may be sent depending on the data contents desired by a transmitter. During a first clock cycle 142, a signal level 124 and a signal level 126 are sent where the signal level 124 shows the bit combination "01" and the signal level 126 indicates the bit combination "00". During a second clock cycle 144, a signal level 128 and 130 are sent. In this example, the signal level 128 contains data "10", and the signal level 130 contains data "11". During a third clock cycle 146, a signal level 134 and a signal level 136 are sent. The signal level 134, in this example, includes bit combination "10" and the signal level 136 illustrates the bit combination "11". During a fourth clock cycle 148, a signal level 138 includes bit combination "00" and a signal level 140 includes bit combination "11". Therefore, by using four voltage levels in data transmission, one of four different bit combinations may be sent by a specific signal level. In one embodiment, when the data transmission is double clocked, four bits of data may be sent during any one cycle as opposed to two bits that can be sent by prior art systems.

As a result, in data transmission systems where data transmission is double clocked, four bits of data may be sent during each clock cycle. Therefore, if the data transmission frequency is 320 bytes/sec, 1.28 Gbyte/sec of data may be sent. Optimally, data transmission may be effectively doubled as compared with prior art data transmission systems. This can greatly increase data transmission throughput and consequently optimize data communication between a transmitter and a receiver.

Figure 3:
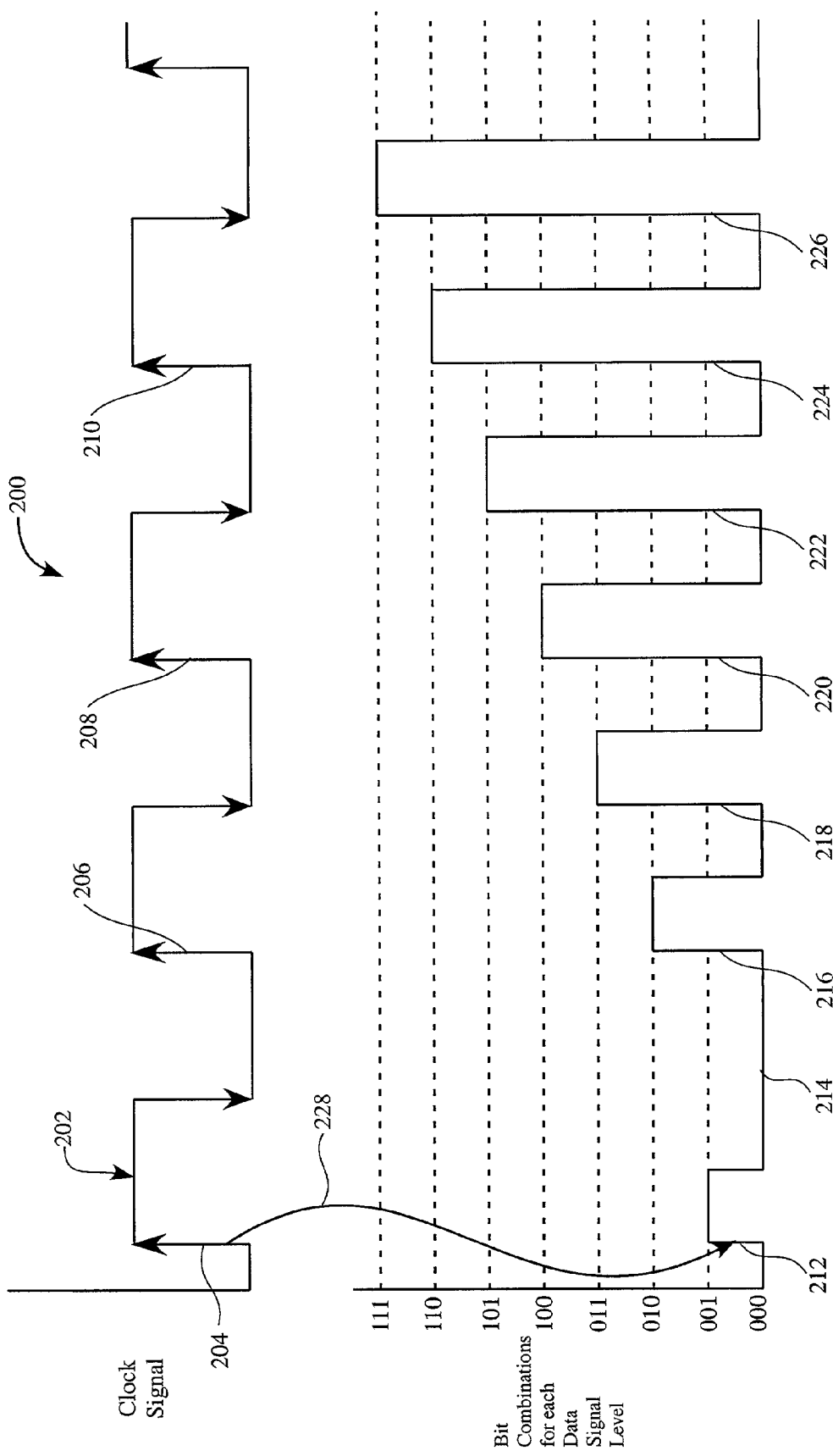
FIG. 3 illustrates a diagram that shows clock cycles at a given frequency compared with MLC data transmissions in accordance with one embodiment of the present invention.

FIG. 3 illustrates a diagram 200 that shows clock cycles at a given frequency compared with MLC data transmissions in accordance with one embodiment of the present invention. In this embodiment, the diagram 200 shows clock cycles 202 at a particular frequency. It should be appreciated that the MLC data transmission methodology may be utilized where the data transmissions are clocked at any suitable frequency such as, for example, 10 MHz, 20 MHz, 40 MHz, 80 MHz, etc. The clock diagram is compared with an MLC data transmission diagram. In this embodiment, the data transmission is double clocked so two signal levels are sent during each clock cycle. In this embodiment eight voltage levels are shown for the transmission signal which each signify different bit combinations of three bits. Therefore, each of the eight voltage levels that may be utilized for signal levels in data transmission contains 1 of 8 contents of data. By having eight levels, all types of data content possibilities that may be needed with three bits of data may be sent. Therefore, in this manner, by increasing the numbers of voltage levels by $2^n$ where n is the number of bits being sent by a particular signal level, any of the combinations of data that may be generated by three bits of digital information can be transmitted by one signal level. By this methodology, the number of bits sent per signal level may be increased by increasing the number of voltage levels (and in effect the number of available signal levels) to $2^n$ levels. Consequently, if four bits of data are desired to be sent per signal level, then 16 different voltage levels are needed for this type of data transmission system and hence n=4. If five bits of data are desired to be sent per signal level, then 32 different voltage levels are needed for this type of data transmission system and so on. As a result, as long as each of the voltage levels may be differentiated from the other, any suitable number of bits may be sent per signal level such as, for example, 4, 8, 16, 32, 64, 128, 256, 512, etc.

In one embodiment, the eight voltage levels shown signify bit combinations of "000", "001", "010", "011", "100", "101", "110", and "111". It should be appreciated that the actual voltage levels may be any suitable voltages as long as each of the voltage levels are discernible from another in a data transmission system as described herein. In one embodiment, signal level voltages can be increments of 0.625 v, from 0 to a maximum of 5v representing the "111". In this embodiment each of the levels from 0 to 5 volts representing the bit combinations of "000", "001", "010", "011", "100", "101", "110", and "111" respectively. Therefore, depending on the voltage of the signal sent, one of the eight data bit combinations are sent. The following description of the data transmission shown in FIG. 3 is merely exemplary and any suitable data content may be sent depending on the data contents desired by any suitable type of transmitter. The clock diagram shows how the clock cycles 202 initiates MLC data transmissions as shown by an initiator 228. Such initiation occurs both at the leading edge and the trailing edge of the clock cycles in a double clocking system. During a first clock cycle 204, a signal level 212 and a signal level 214 are sent where the signal level 212 indicates the bit combination "001" and the signal level 214 carries the bit combination "000". During a second clock cycle 206, a signal level 216 and a signal level 218 are sent where the signal level 216 indicates the bit combination "010" and the signal level 218 contains bit combination "011". During a third clock cycle 208, a signal level 220 and a signal level 222 are sent where the signal level 220 includes the bit combination "100" and the signal level 222 illustrates the bit combination "101". During a fourth clock cycle 210, a signal level 224 and a signal level 226 are sent. The signal level 224 shows the bit combination "110" and the signal level 226 has the bit combination "111".

Consequently, in data transmission systems where data transmission is double clocked, six bits of data may be sent during each clock cycle. Therefore, if the data transmission rate is 320 Mbytes/sec, 1.92 Gbytes/sec of data may be sent. In this embodiment, data throughput may be increased to over 3 times what is typically seen in the prior art. In such a fashion, data transfer throughput may be greatly enhanced to intelligently optimize data transmission in computer systems.

Figure 4:
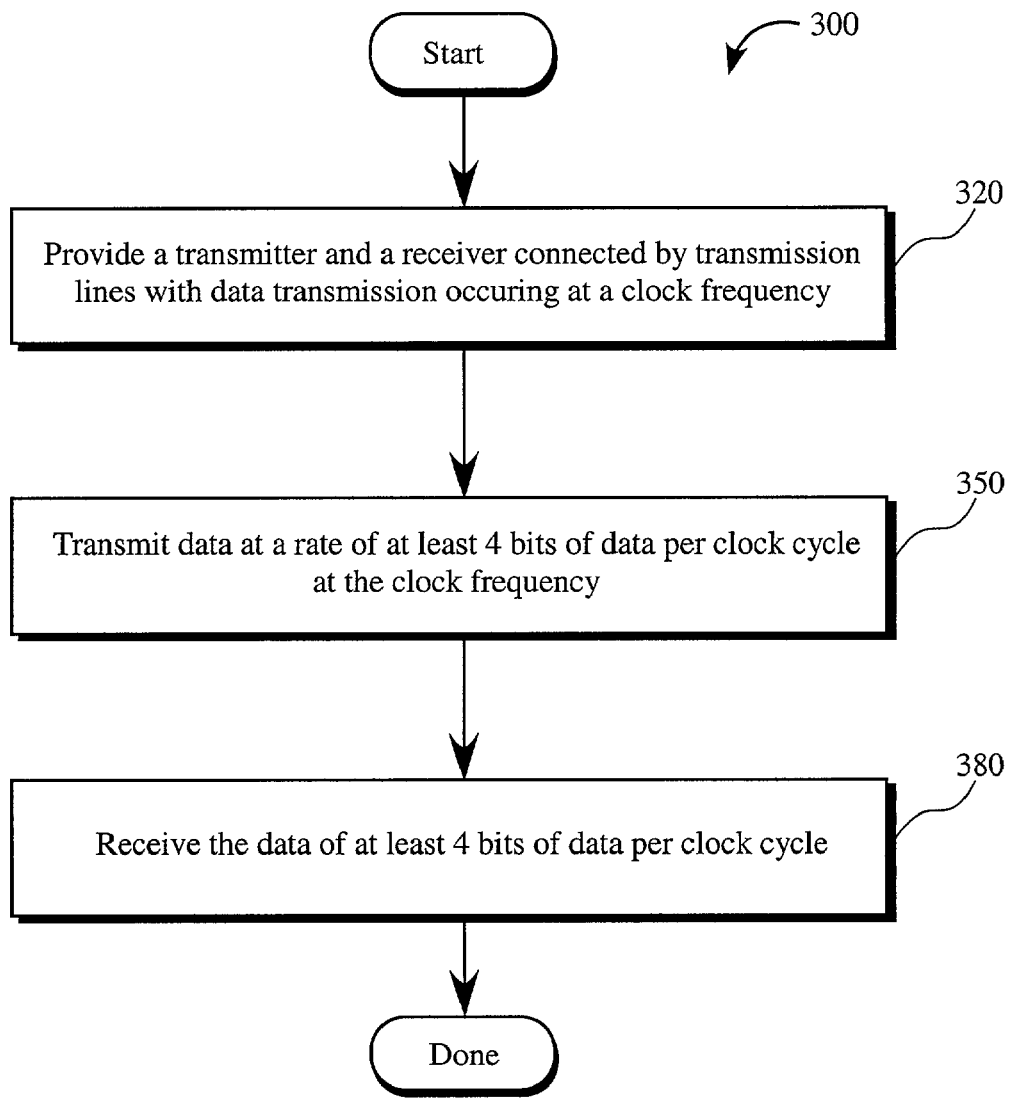
FIG. 4 illustrates a flowchart defining a method to transmit data using multilevel coding in accordance with one embodiment of the present invention.

FIG. 4 illustrates a flowchart 300 defining a method to transmit data using multilevel coding in accordance with one embodiment of the present invention. It should be understood that the processes depicted in the flowchart 300 may be in a program instruction form written on any type of computer readable media. For instance, the program instructions can be in the form of software code developed using any suitable type of programming language. For completeness, the process flow of FIG. 4 will illustrate an exemplary process whereby data is transferred from a transmitter to a receiver utilizing multilevel coding to optimize data transfer.

The method begins with operation 320 which provides a transmitter and a receiver connected by transmission lines with data transmission occurring at a clock frequency. In this operation a multilevel code (MLC) transmitter and an MLC receiver may communicate through the transmission lines. The MLC transmitter and the MLC receiver operates to transmit data using digital signals where a certain amount of data is sent at a particular clock frequency. It should be appreciated that the MLC transmitter and MLC receiver may be any suitable computer device or component that may serve to send and/or receive data in the methodology described herein.

The method then progresses to operation 350 which transmits data at a rate of at least 4 bits of data per clock cycle at the clock frequency. It should be understood that the method may be operated at any suitable clock frequency depending on user desires, and also that any suitable number of data per clock cycle may be sent as long as each of the specific voltage levels of the signals are distinguishable. In one embodiment, at least 4 bits of data are transferred for every clock cycle at a frequency of 320 MHz. In another embodiment, at least 8 bits of data may be sent at a frequency of 640 MHz. The transmission as described in operation 350 occurs through multilevel coding of bit combinations where a certain signal level voltage corresponds with a certain bit combination. Where two bits are sent per signal level and data transmission is double clocked, four bits of data may be sent during a clock cycle. When two bits of data are sent per each signal level (e.g., twice during a clock cycle where double clocking takes place), 4 different voltages may be used to determine the bit combination indicated by the signal level. Operation 350 is described in further detail in reference to FIG. 5.

After operation 350, the method moves to operation 380 where the data of at least 4 bits of data per clock cycle are received. In this operation, the receiver may determine the bit combination by matching a signal level voltage with one of the bit combinations.

Figure 5:
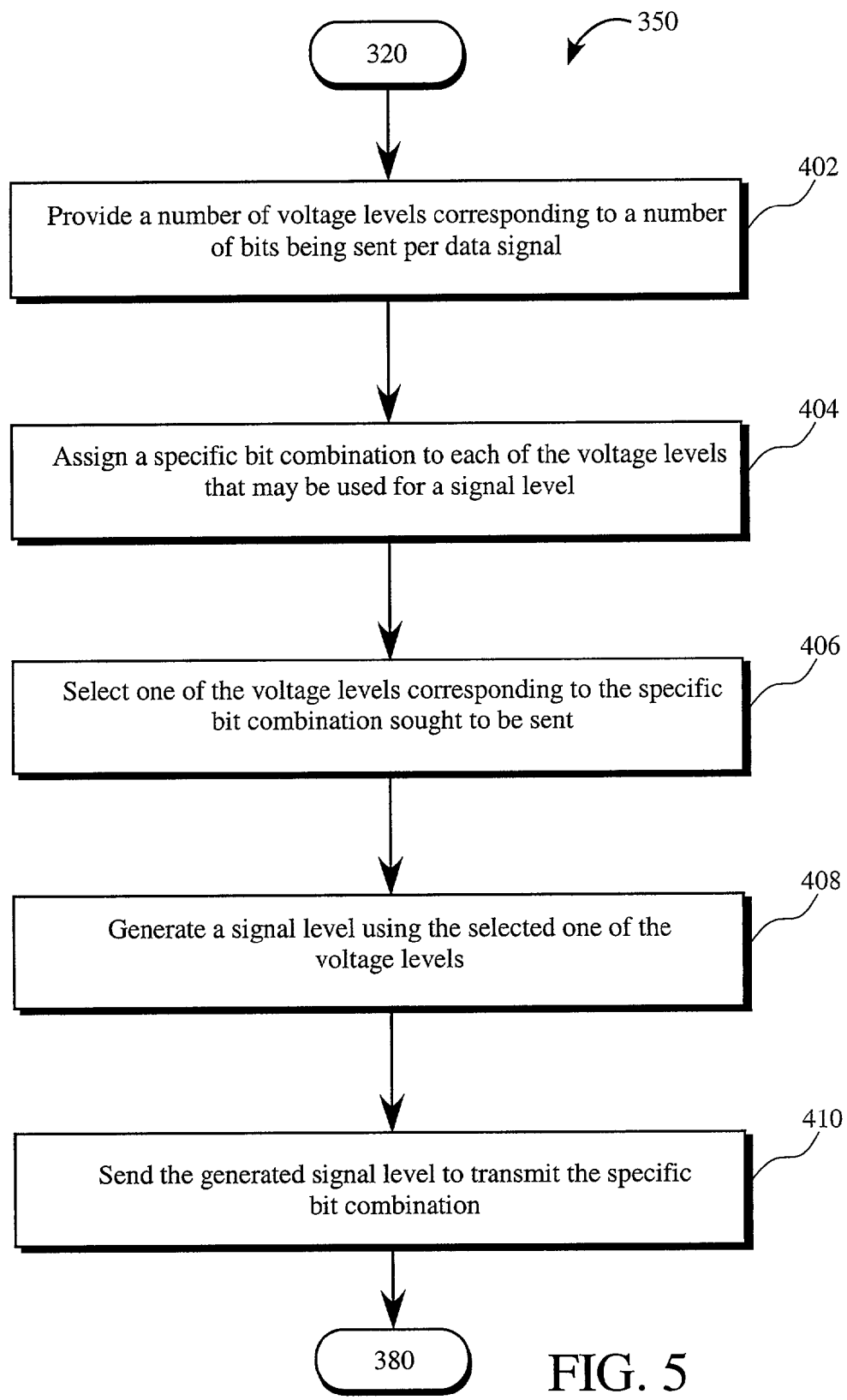
FIG. 5 shows a flowchart defining the transmitting of data at a rate of at least 4 bits of data per clock cycle at the clock frequency in accordance with one embodiment of the present invention.

FIG. 5 shows a flowchart 350 defining the transmitting of data at a rate of at least 4 bits of data per clock cycle at the clock frequency in accordance with one embodiment of the present invention. In this embodiment, the flowchart 350 begins with operation 402 which provides a number of voltage levels corresponding to a number of bits being sent per signal level. As discussed above in reference to FIGS. 2B and 3, the number of voltage levels are equal to 2 to the power of the number of bits being sent per signal level. Therefore, the number of signal level voltages equals $2^n$ where n equals the number of bits being sent per signal level. For example, as in the embodiment described in FIG. 2B, if 2 bits are being sent per signal level, then 4 signal voltage levels would correspond (or code) to the bit combinations that are capable of being formed by two bits.

After operation 402, the method moves to operation 404 which assigns a specific bit combination to each of the voltage levels that can be used for a signal level. As discussed in FIGS. 2B and 3, each of the bit combinations that can be formed by the number of bits sent per signal level has a corresponding voltage level. In this way a particular signal level with a specific voltage level is coded to a specific bit combination. Therefore, more data may be sent per signal level when a particular signal can represent multiple bits.

Then operation 406 selects one of the signal levels corresponding to the specific bit combination sought to be sent. In this operation, whatever bit combination that is desired to be sent is matched with the corresponding signal level that codes to the bit combination.

After operation 406, the flowchart 350 moves to operation 408 which generates the signal level using the selected one of the voltage levels. In this operation, the transmitter generates the signal level required to transmit the data desired as determined in operation 406.

Then operation 410 sends the generated signal level to transmit the specific bit combination. In this operation, the transmitter sends the generated signal along transmission lines to a receiver. The receiver may receive the signal and decipher the bit combination of data transmission by matching the signal level voltage to the corresponding bit combination. In one embodiment, in a double clocked data transmission system, the method sends two generated signal voltages per clock cycle at a given frequency. In this way through intelligent managing and coding of bit combinations the transmitter and the receiver may communicate with each other through code to optimize data transfer rates thus resulting in more efficient computer system operations.

It should be understood that the embodiments of the present invention provide methods that enable intelligent optimization of the amounts of data transmitted per data transmission. In this manner, the data (as shown by the number and types of bits) may be encoded onto voltage levels. Therefore, as long as each of the voltage levels may be differentiated, any suitable desired number of bits may be sent for any clock cycle during digital data transmission.

The present invention may be implemented using an appropriate type of software driven computer-implemented operation. As such, various computer-implemented operations involving data stored in computer systems to drive computer peripheral devices (i.e., in the form of software drivers) may be employed. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as ascertaining, identifying, scanning, or comparing.

Any of the operations described herein that form part of the invention are useful machine operations. Any appropriate device or apparatus may be utilized to perform these operations. The apparatus may be specially constructed for the required purposes, or it may be a general purpose computer selectively activated or configured by a computer program stored in the computer. In particular, various general purpose machines may be used with computer programs written in accordance with the teachings herein, where it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present invention is to be considered as illustrative and not restrictive, and the invention is not to be limited to the details given herein, but may be modified within the scope and equivalence of the appended claims.

What is claimed is:

1. A method to transmit bits of data over a bus, said method comprising:
    assigning a voltage level to each one of a plurality of bit combinations;
    generating a signal level having the voltage level corresponding to one of the plurality of bit combinations sought to be transmitted, and
    transmitting the signal level to a receiver, twice during a clock cycle defined by a clock signal, with a first transmission of the signal level initiating as said clock signal transitions from a first voltage value to a second voltage value, defining a leading edge, a second transmission of said signal level initiating as said clock signal transitions from said second voltage value to said first voltage value, defining a trailing edge, to send a subgroup of the plurality of bit combinations on said bus, said first and second voltage values being different.

2. The method as recited in claim 1, further comprising, matching the voltage level of the signal level with a corresponding one of the plurality of bit combinations.

3. The method as recited in claim 1, wherein there are four voltage levels including 5v, 3v, 1.5v, 0v.

4. The method as recited in claim 1, wherein each one of the plurality of bit combinations include two binary bits, the plurality of bit combinations being 00, 01, 11, and 10.

5. The method as recited in claim 1, wherein an amplitude of the signal level distinguishes one of the plurality of bit combinations from the remaining bit combinations of said plurality of bit combinations.

6. The method as recited in claim 1, wherein four voltage levels of 5v, 3v, 1.5v, 0v correspond to bit combinations of 11, 10, 01, and 00.

7. The method as recited in claim 1, wherein the data transmission interval is one of a full clock cycle and a half clock cycle.

8. The method as recited in claim 1, wherein dual edge clocking is utilized so the transmitting occurs twice every clock cycle.

9. The method as recited in claim 1, wherein data is transmitted at a rate of four times the data transmission frequency.

10. A method to transmit bits of data over a bus, said method comprising:
    assigning each one of at least four voltage levels to a corresponding one of at least four bit combinations;
    generating a signal level using one of the at least four voltage levels, the one of the at least four voltage levels corresponding to a bit combination to be transmitted;
    transmitting the signal level to a receive, twice during a clock cycle defined by a clock signal, with a first transmission of the signal level initiating as said clock signal transitions from a first voltage value to a second voltage value, defining a leading edge, a second transmission of said signal level initiating as said clock signal transitions from said second voltage value to said first voltage value, defining a trailing edge, to send a plurality of bits of data encoded in the one of the at least four voltage level on said bus, said first and second voltage values being different; and
    matching the one of the at least four voltage levels of the signal level with a corresponding one of the at least four bit combinations.

11. The method as recited in claim 10, wherein the at least four voltage levels include 5v, 3v, 1.5v, 0v.

12. The method as recited in claim 10, wherein the at least four bit combinations include 00, 01, 11, and 10.

13. The method as recited in claim 10, wherein an amplitude of a signal determines data carried by the signal.

14. The method as recited in claim 10, wherein the at least four voltage levels of 5v, 3v, 1.5v, 0v correspond to the at least four bit combinations of 11, 10, 01, and 00 respectively.

15. The method as recited in claim 10, wherein the transmitting occurs during a data transmission interval, the data transmission interval being one of a full clock cycle and a half clock cycle.

16. The method as recited in claim 10, wherein dual edge clocking is utilized so the transmitting occurs twice every clock cycle.

17. The method as recited in claim 10, wherein data is transmitted at a rate of four times the data transmission frequency.

18. A method to transmit bits of data over a bus, said method comprising:

assigning each one of at least eight voltage levels to a corresponding one of at least eight bit combinations, each of the at least eight bit combinations including at least 3 bits of data;

generating a signal level using the one of at least eight voltage levels, the one of at least eight voltage levels corresponding to a bit combination to be transmitted; and transmitting the signal level, twice during a clock cycle defined by a clock signal, with a first transmission of the signal level initiating as said clock signal transitions from a first voltage value to a second voltage value, defining a leading edge, a second transmission of said signal level initiating as said clock signal transitions from said second voltage value to said first voltage value, defining a trailing edge, to a receiver, said first and second voltage values being different.

19. The method as recited in claim 18, further comprising, matching the one of at least eight voltages of the signal level with the corresponding one of at least eight bit combinations to obtain the three bits of data from the signal level.

20. The method as recited in claim 18, wherein the at least eight voltage levels ranging from about 0v to about 5v in 0.625v intervals.

21. The method as recited in claim 18, wherein the at least eight bit combinations include 000, 001, 010, 011, 100, 101, 110, and 111.

22. The method as recited in claim 18, wherein an amplitude of the signal level determines data carried by the signal.

23. The method as recited in claim 18, wherein dual edge clocking is utilized to transmit the data.

24. The method as recited in claim 18, wherein data is transmitted at a rate of six times the data transmission frequency.

\* \* \* \* \*